US008575839B2

(12) United States Patent
Inoue et al.

(10) Patent No.: US 8,575,839 B2
(45) Date of Patent: Nov. 5, 2013

(54) HEADLAMP LED LIGHTING APPARATUS AND VEHICLE HEADLAMP LIGHTING SYSTEM

(75) Inventors: Yu Inoue, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 151 days.

(21) Appl. No.: 13/381,876

(22) PCT Filed: Sep. 10, 2009

(86) PCT No.: PCT/JP2009/004497
§ 371 (c)(1),
(2), (4) Date: Dec. 30, 2011

(87) PCT Pub. No.: WO2011/030381
PCT Pub. Date: Mar. 17, 2011

(65) Prior Publication Data

US 2012/0098430 A1 Apr. 26, 2012

(51) Int. Cl.
*B60Q 1/04* (2006.01)

(52) U.S. Cl.
USPC .......... 315/82

(58) Field of Classification Search
None
See application file for complete search history.

(56) References Cited

U.S. PATENT DOCUMENTS 6,906,467 B2 * 6/2005 Stam et al. .......... 315/82

FOREIGN PATENT DOCUMENTS

| | | | |
|---|---|---|---|
| JP | 11-091437 | A | 4/1999 |
| JP | 2006-210219 | A | 8/2006 |
| JP | 2007-287964 | A | 11/2007 |
| JP | 2008-192625 | A | 8/2008 |
| JP | 2009-111035 | A | 5/2009 |

* cited by examiner

*Primary Examiner* — Crystal L Hammond
(74) *Attorney, Agent, or Firm* — Birch, Stewart, Kolasch & Birch, LLP

(57) ABSTRACT

A headlamp LED lighting apparatus, which lights an LED block 2 having a plurality of LEDs connected in series, samples the output voltage of the headlamp LED lighting apparatus, calculates the average voltage during every prescribed interval, and has a storage unit for storing the average voltage during every prescribed interval calculated. A control circuit 8 compares the voltage variation in the average voltage during every prescribed interval read out of the storage unit with a prescribed threshold, and decides an LED failure of the LED block 2 from a result of the comparison.

16 Claims, 5 Drawing Sheets

HEADLAMP LED LIGHTING APPARATUS AND VEHICLE HEADLAMP LIGHTING SYSTEM

TECHNICAL FIELD

The present invention relates to a headlamp LED lighting apparatus for lighting vehicle headlamps using LEDs (Light Emitting Diodes) as a light source and a vehicle headlamp lighting system using the same.

BACKGROUND ART

As a light source of vehicle headlamps, longer-life, lower power consumption LEDs have been spread as a substitute for halogen lamps. On the other hand, as for headlamps using LEDs as a light source, since the amount of light emission of a single LED is still small, a plurality of LEDs are arranged in a block to be lit so as to maintain the amount of light emission required as the headlamps. Thus, since the amount of light emission of the individual LEDs is small, it can easily occur that even if a part of the LEDs of the headlamps has stopped, a driver does not become aware of that. Accordingly, a device is necessary which detects that a part of the LEDs of the headlamps is not lit and notifies the driver of that.

Patent Document 1 discloses a lighting apparatus that lights headlamps which employ a block arranged by connecting a plurality of LEDs in series as the light source, and detects that a part of the LEDs of the headlamps short-circuits and becomes abnormal. The apparatus measures the output voltage of the lighting apparatus and the voltage of a single LED in the block, and makes, if a relative value between them varies, a decision that a part of the plurality of LEDs becomes abnormal.

In addition, Patent Document 2 discloses a lighting apparatus that lights headlamps which employ a block arranged by connecting a plurality of LEDs in series as the light source. The apparatus captures a moment at which a change occurs in the output voltage of the lighting apparatus, and makes a decision that abnormality occurs because of a short circuit of a part of a plurality of LEDs.

As the foregoing documents offer as a problem, if the plurality of LEDs connected in series have variation in the forward voltage of the individual LEDs, even if the forward voltage of a single LED in the block of the series connection becomes zero volt because of a short circuit failure or becomes a Zener voltage of its parallel Zener diode because of an open failure, they are hidden under a variation tolerance of the output voltage of the LED lighting apparatus, and a decision of the failure cannot be made from only the output voltage. Although measuring the forward voltage of each of the plurality of LEDs constituting the LED block makes it possible to locate the failure, this is not reasonable because the configuration becomes complicated and a large number of measuring operations are very troublesome.

On the other hand, the forward voltage of the LEDs varies every moment in accordance with their energized duration and ambient temperature of travelling of a vehicle such as a temperature of an environment in which the headlamps are lit. Accordingly, the Patent Document 2, which employs only instantaneous voltage changes, has a problem of being unable to detect a failure accurately. In addition, the Patent Document 1, which monitors the forward voltage of a single LED to correct the changes in the forward voltages of the LEDs, has a problem of requiring new wiring for measuring the voltage and thus complicating the configuration.

The present invention is implemented to solve the foregoing problems. Therefore it is an object of the present invention to provide a headlamp LED lighting apparatus and a vehicle headlamp lighting system using the same, the apparatus being simple in construction and capable of positively detecting an abnormality occurring in a part of a plurality of LEDs in accordance with a change of the average of the output voltage detected at every prescribed interval in the vehicle headlamp that employs a block of a plurality of LEDs connected in series as a light source.

PRIOR ART DOCUMENT

Patent Document

Patent Document 1: Japanese Patent Laid-Open No. 2006-210219.

Patent Document 2: Japanese Patent Laid-Open No. 2009-111035.

DISCLOSURE OF THE INVENTION

A headlamp LED lighting apparatus in accordance with the present invention includes, in a headlamp LED lighting apparatus for lighting a headlamp which employs as its light source an LED block having a plurality of LEDs connected in series, a control unit for supplying lighting power to the LED block, the control unit comprising: an average processing unit for calculating an average voltage during every prescribed interval by sampling an output voltage for lighting the LED block; and a storage unit for storing the average voltage during every prescribed interval calculated by the average processing unit, wherein the control unit for controlling power for lighting the LEDs has a function of deciding an LED failure of the LED block in accordance with a result of comparing a voltage variation in the average voltage during every prescribed interval read out of the storage unit with a prescribed threshold.

According to the present invention, it comprises the average processing unit for calculating the average voltage during every prescribed interval by sampling the output voltage for lighting the LED block; and the storage unit for storing the average voltage during every prescribed interval calculated by the average processing unit, and the control unit for controlling power for lighting the LEDs has the function of deciding the LED failure of the LED block in accordance with the result of comparing the voltage variation in the average voltage during every prescribed interval read out of the storage unit with the prescribed threshold.

With such a configuration, it has an advantage of being able to positively detect the variation in the output voltage, which changes sharply owing to the LED failure, from the output voltage that varies every moment with a simple arrangement without requiring wiring for monitoring the forward voltage of an LED. For example, using for the decision the average of the output voltage obtained by a number of times of samplings makes it possible to reduce influence due to the variation in the LED lighting voltage because of the temperature change, thereby being able to make a failure detection with higher reliability.

EMBODIMENTS FOR CARRYING OUT THE INVENTION

The best mode for carrying out the invention will now be described with reference to the accompanying drawings to explain the present invention in more detail.

Embodiment 1

Figure 1:
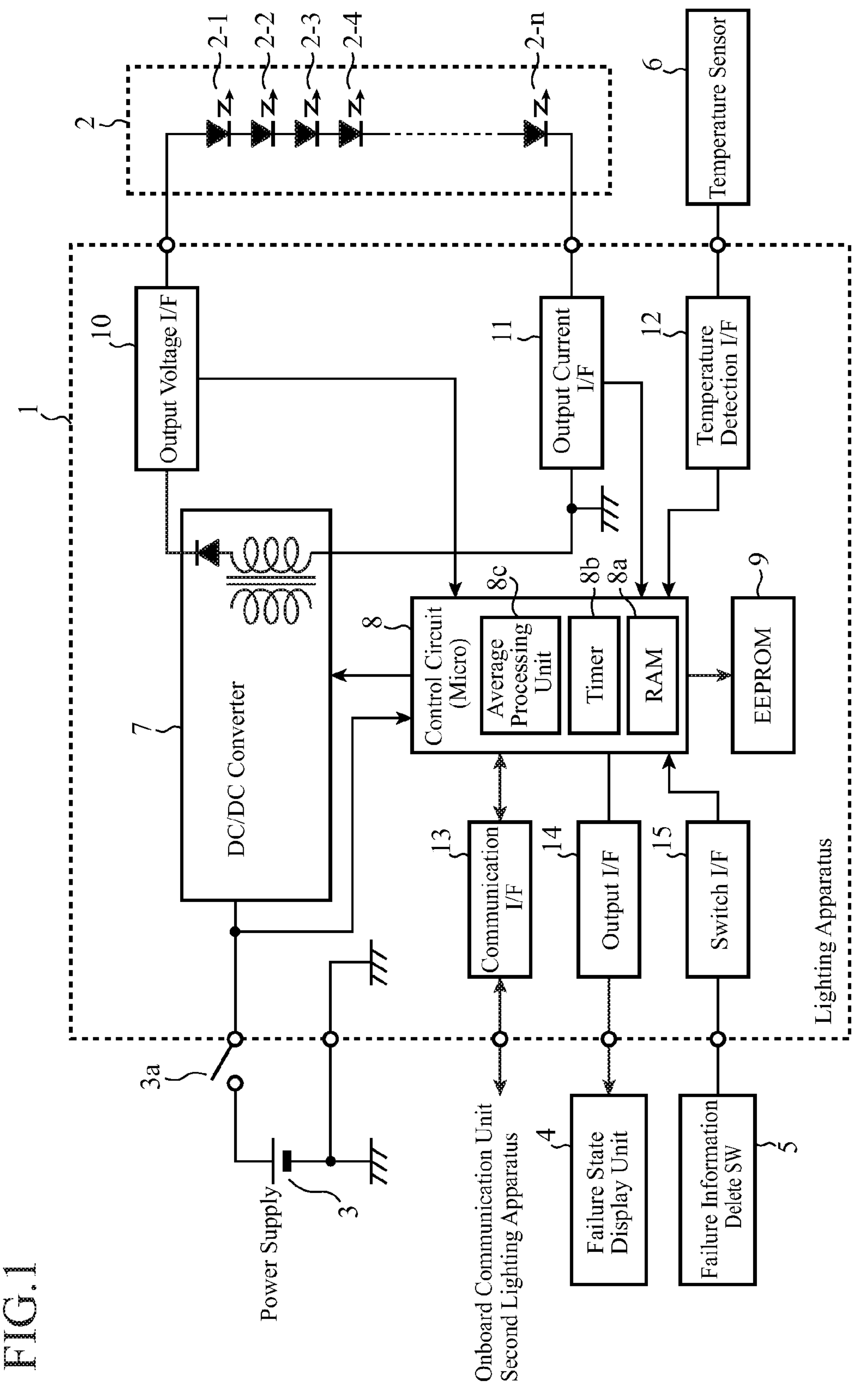
FIG. 1 is a block diagram showing a configuration of a headlamp LED lighting apparatus of an embodiment 1 in accordance with the present invention.

FIG. 1 is a block diagram showing a configuration of a headlamp LED lighting apparatus of an embodiment 1 in accordance with the present invention. In FIG. 1, the headlamp LED lighting apparatus 1 of the embodiment 1 has as its peripheral components an LED block 2, a power supply 3, a power supply switch 3*a*, a failure state display unit 4, a failure information delete switch (SW) 5 and a temperature sensor 6; and comprises a DC/DC converter 7, a control circuit 8, an EEPROM (Electrically Erasable and Programmable Read Only Memory) 9, an output voltage I/F (interface) 10, an output current I/F 11, a temperature detection I/F 12, a communication I/F 13, an output I/F 14 and a switch I/F 15. Incidentally, the lighting apparatus 1 is installed for each of the right and left headlamps of a vehicle.

The LED block 2, which constitutes the light source of a vehicle headlamp, comprises a plurality of (n) LEDs 2-1-2-*n* connected in series. The power supply 3 is a DC power supply for supplying the DC/DC converter 7 with a DC voltage. The power supply switch 3*a* passes or stops the DC voltage to be supplied to the DC/DC converter 7. The failure state display unit (failure information presentation unit) 4, which is a display device for displaying a failure state of the LED block 2 detected by the control circuit (control unit) 8, employs an alarm lamp or display device mounted on onboard equipment.

The failure information delete SW 5 is provided for performing erasing manipulation of the failure information in the control circuit 8 from outside. By performing the erasing manipulation using the failure information delete SW 5, the failure information about the LED block 2 stored in the EEPROM 9 is deleted. The temperature sensor 6 is a sensor for measuring the temperature of the LED block 2 or the ambient temperature of the LED block 2 corresponding thereto.

The DC/DC converter 7 converts the power supply voltage of the power supply 3 to a prescribed DC voltage under the control of the control circuit 8, and outputs it. The control circuit 8, which includes a microcomputer (micro) for controlling the operation of the lighting apparatus 1, comprises a RAM (Random Access Memory) (storage unit) 8*a* for storing output voltage information indicating the output voltage from the DC/DC converter 7, a timer 8*b* for measuring the time elapsed from a start of lighting, and so on. In addition, as a function implemented by executing control software, the control circuit 8 comprises an average processing unit 8*c* for calculating an average voltage of the output voltage.

The EEPROM (storage unit, nonvolatile storage unit) 9 is a storage for storing the failure information about the LED block 2 detected by the control circuit 8. Besides the EEPROM, the storage unit can be a nonvolatile memory device such as a flash memory capable of retaining its storage contents even if the power supply of the lighting apparatus 1 is turned off.

The output voltage I/F 10, which is an interface for the output voltage the DC/DC converter 7 supplies to the LED block 2, comprises a voltage detecting circuit for detecting the output voltage. The output current I/F 11, which is an interface for the output current the DC/DC converter 7 supplies to the LED block 2, comprises a current detecting resistor for detecting the output current, for example.

To supply the LED block 2 with a current with a prescribed value that enables it to provide the amount of light emission required as the light source for the headlamp, the control circuit 8 samples the output current flowing through the LED block 2 via the output current I/F 11, and controls the DC/DC converter 7 in such a manner as to set the output current at the prescribed value.

The temperature detection I/F 12, which is an interface between the temperature sensor 6 and the control circuit 8, supplies the temperature information detected by the temperature sensor 6 to the control circuit 8. The communication I/F 13 is an interface between the control circuit 8 and an external device. As the external device, besides the other headlamp lighting apparatus mounted on the vehicle, there is an onboard communication device for carrying out communication via an onboard communication network. For example, the vehicle-speed information detected with a vehicle-speed sensor or the like is supplied to the control circuit 8 via a communication connection between the onboard communication device and the communication I/F 13. Incidentally, a configuration is also possible which provides the lighting apparatus 1 with an interface with the vehicle-speed sensor, and supplies the vehicle-speed information detected with the vehicle-speed sensor to the control circuit 8 directly.

The output I/F 14 is an interface between the failure state display unit 4 and the control circuit 8. The control circuit 8 supplies the failure information, as to which the control unit 8 makes a decision that it occurs in the LED block 2, to the failure state display unit 4 via the output I/F 14 so that the failure state display unit 4 displays the failure state. The switch I/F 15 is an interface between the failure information delete SW 5 and the control circuit 8. When erasing manipulation is performed using the failure information delete SW 5, the manipulation information is delivered to the control circuit 8 via the switch I/F 15. Thus, the control circuit 8 deletes the failure information from the EEPROM 9 in response to the erasing manipulation.

Figure 2:
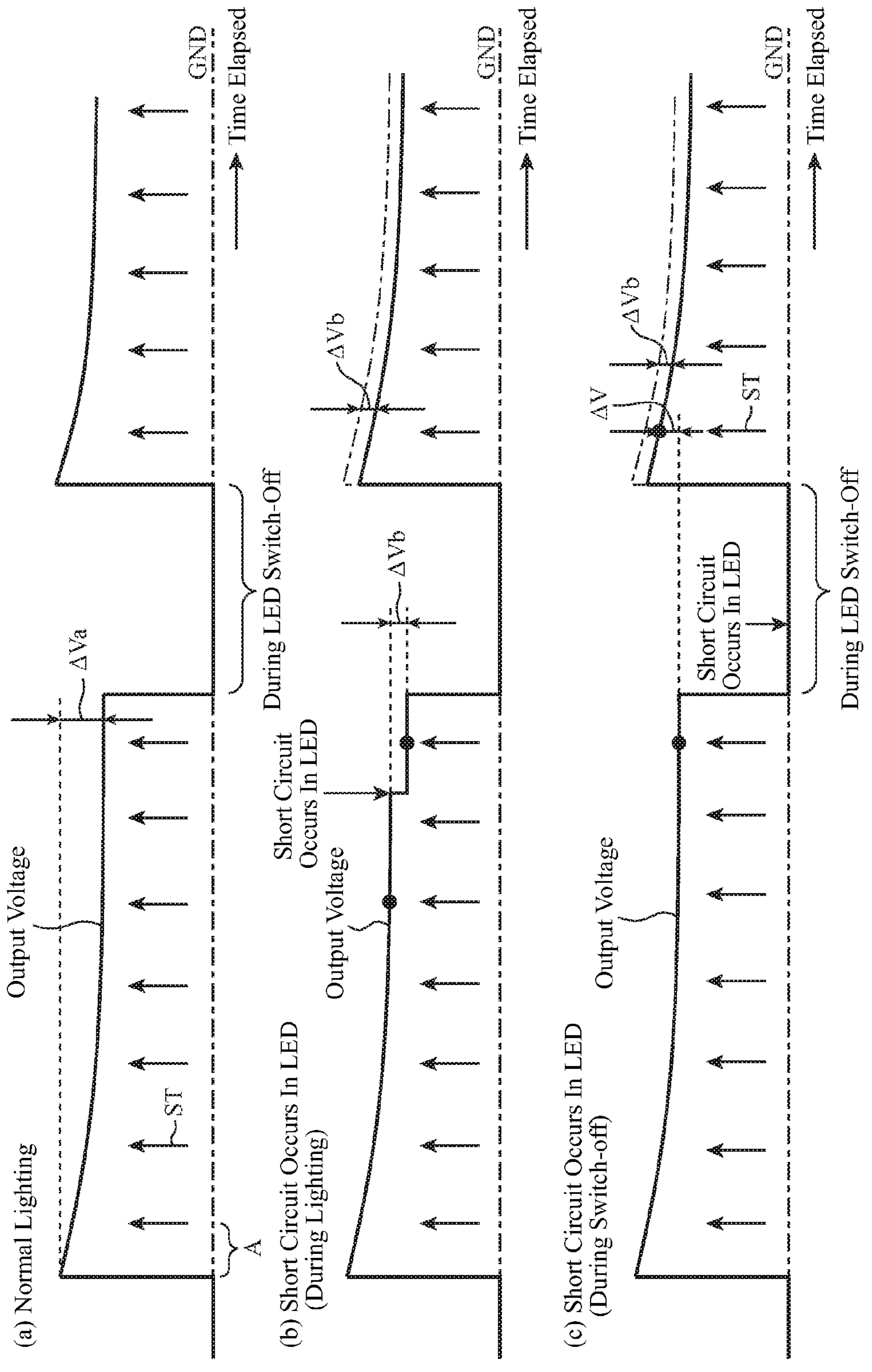
FIG. 2 is a diagram showing output voltage waveforms of the headlamp LED lighting apparatus of the embodiment 1.

FIG. 2 is a diagram showing waveforms of the output voltage of the headlamp LED lighting apparatus of the embodiment 1. FIG. 2(*a*) shows a waveform of the output voltage in a normal lighting mode; FIG. 2(*b*) shows a waveform of the output voltage when a short-circuit failure occurs in an LED during lighting; and FIG. 2(*c*) shows a waveform of the output voltage when a short-circuit failure occurs in an LED during switch-off.

As for the voltage (forward voltage) applied to the individual LEDs 2-1-2-*n* while causing the output current with the prescribed value to flow through the LED block 2, it varies depending on the temperature of LED chips. Such temperature variation is mainly due to self-heating owing to light emission (current supply).

For example, during a period of time immediately after lighting (about one minute) denoted by a symbol A in FIG. 2(*a*), the forward voltage varies because of the current supply to the LEDs 2-1-2-*n* so that the waveform of the output voltage reduces gradually after lighting with a high voltage. Since the temperature of the LED chips is low immediately after lighting, the forward voltage is high, and the voltage variation ΔVa between the output voltage immediately after lighting and that after the forward voltage becomes stable is large.

In addition, as for the forward voltage of the LEDs, it is not uniform, but has variation even among the same type of LEDs. For example, assume that the LED block 2 is formed by connecting 10 LEDs 2-1-2-10 in series, and that the forward voltage of the LED 2-*i* (i=1-10) is 3 V in rating and its variation is ±0.3 V. In this case, the rated voltage applied to the LED block 2 is 3 V×10=30 V and its variation is ±3 V. Thus, the variation of the voltage applied to the LED block 2 has a value corresponding to the forward voltage of a single LED. Accordingly, by only measuring the output voltage to the LED block 2, it is impossible to distinguish between a voltage fall due to the variation and a voltage drop due to a defect (short-circuit) of a single LED 2-*i*.

On the other hand, since a voltage change due to a short-circuit failure of an LED occurs in a short time, detecting voltages before and after the failure and using the difference between the output voltages makes it possible to detect the short-circuit failure of an LED. For example, as shown in FIG. 2(*b*) and FIG. 2(*c*), a waveform of the output voltage after a short-circuit of an LED has a voltage fall (the voltage variation ΔVb).

In addition, when a short-circuit occurs in an LED during switch-off of the LED block 2, followed by turning on the LED block 2, a significant voltage change can occur between the output voltages before and after sampling depending on sampling timing (ST) (the voltage variation ΔV).

Thus, since the forward voltage of the LEDs has variation and varies depending on the temperature of the LED chips, it is difficult to detect a short-circuit of a part of LEDs of the LED block 2 by only comparing the change in the output voltage with a prescribed fixed voltage. Yet, a method of detecting by sampling the voltage and by detecting an edge at which the voltage changes can easily suffer a disturbance like noise and has low detection reliability.

In view of this, the embodiment 1 samples the output voltage at timing considering the time elapsed from turning on the LED block 2 and employs the average voltage obtained by averaging sampled output voltages as a failure decision reference, thereby being able to detect the output voltage that has changed owing to a short-circuit of an LED from the output voltage changing every moment. This makes it possible to achieve highly reliable failure detection without suffering the effect of the forward voltage change of the LEDs due to the temperature change.

Next, the operation will be described.

Figure 3:
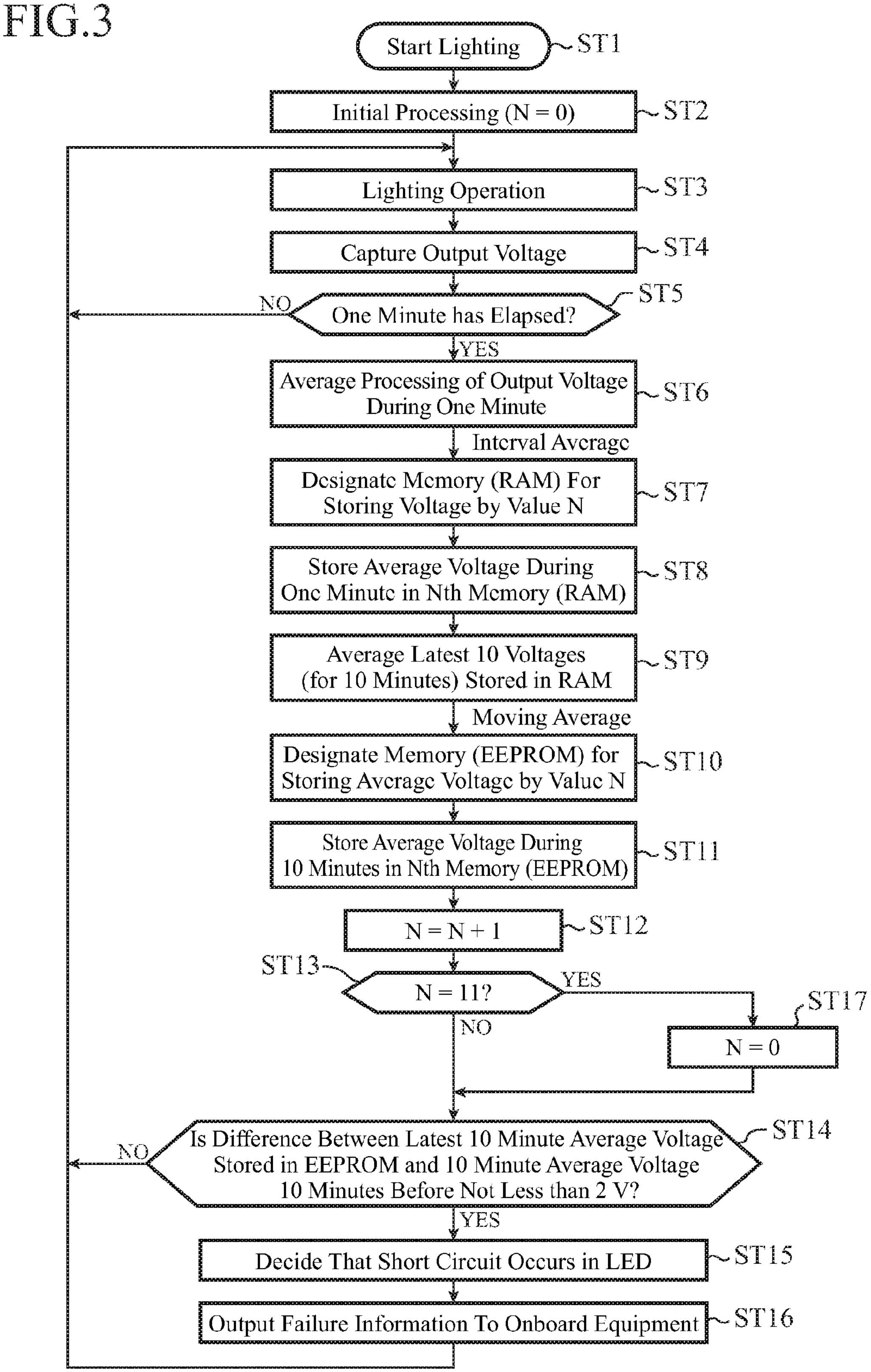
FIG. 3 is a flowchart showing a flow of LED failure detection of the headlamp LED lighting apparatus of the embodiment 1.

FIG. 3 is a flowchart showing a flow of the LED failure detection in the headlamp LED lighting apparatus of the embodiment 1.

First, when a manipulation for starting to light the LED block 2 is performed (step ST1), the control circuit 8 initializes a timing parameter N to zero as initial processing (step ST2). Subsequently, in accordance with the control of the control circuit 8, the DC/DC converter 7 converts the DC voltage of the power supply 3 to the output voltage and supplies it to the LED block 2 via the output voltage I/F 10 (step ST3).

Subsequently, the control circuit 8 captures the output voltage at every prescribed sampling timing (ST) via the output voltage I/F 10 (step ST4). In this case, the control circuit 8 stores values of the output voltage captured in a prescribed work area of the RAM 8*a*.

Next, the control circuit 8 makes a decision as to whether one minute has elapsed or not by using the timer 8*b* (step ST5). If one minute has not yet elapsed (NO at step ST5), it returns to the processing at step ST3 to carryout the lighting operation and sampling of the output voltage at the same time.

If one minute has elapsed (YES at step ST5), the average processing unit 8*c* of the control circuit 8 adds output voltage values for one minute read out of the work area of the RAM 8*a*, and calculates the average voltage (interval average voltage during one minute) by dividing the addition value by the number of samplings in one minute (step ST6). Then it stores the average voltage during one minute in the memory (RAM) corresponding to the timing parameter N (step ST7 and step ST8).

Next, the average processing unit 8*c* of the control circuit 8 reads the average voltages of individual one minutes for the latest 10 minutes from a storage area of N=0-10 in the RAM 8*b*, adds the 10 average voltages, and calculates the average voltage (moving average voltage) by dividing the addition value by “10” (step ST9).

The average processing unit 8*c* stores the average voltage during the 10 minute interval in the memory (EEPROM) corresponding to the timing parameter N (step ST10 and step ST11).

Next, the control circuit 8 adds one to the timing parameter N (step ST12), and makes a decision as to whether the parameter N is 11 or not (step ST13). If the timing parameter N is 11 (YES at step ST13), it resets the timing parameter N (step ST17).

The control circuit 8 reads from the EEPROM 9 the average voltage during the latest 10 minute interval and the average voltage during the 10 minute interval 10 minutes before, compares them and makes a decision as to whether the difference between the average voltages is not less than a prescribed threshold or not (step ST14). In the example of FIG. 3, the prescribed threshold is made 2 V. In addition, the difference between the average voltages is a value obtained by subtracting the average voltage during the latest 10 minute interval from the average voltage during the 10 minute interval 10 minutes before.

Incidentally, the average voltage during the latest 10 minute interval is the average of the output voltage sampled from 10 minutes before to the present time. In addition, the average voltage during the 10 minute interval 10 minutes before is the average of the output voltage sampled from 20 minutes before the present time to the 10 minutes before.

If the difference between the average voltages is less than 2 V (NO at step ST14), the control circuit 8 returns to the processing at step ST3 to repeat the processing from step ST3 to step ST14. If the difference between the average voltages is not less than 2 V (YES at step ST14), the control circuit 8 makes a decision that a short-circuit occurs in an LED in the LED block 2 (step ST15).

Incidentally, even if a switch-off operation of the LED block 2 occurs during lighting because the power supply is turned off, since the average voltage during the 10 minute interval before the switch-off remains in the EEPROM 9, the LED failure occurring during the switch-off as shown in FIG. 2(*c*) can be detected.

Detecting that a short circuit occurs in an LED of the LED block 2, the control circuit 8 supplies the onboard equipment with the failure information indicating the occurrence of the short circuit of the LED via the output I/F 14 (step ST16).

Thus, the failure state display unit 4 of the onboard equipment displays the failure information.

As for the display of the failure information, the failure state display unit 4 carries it out with the display device of the onboard equipment, and it can indicate which one of the right and left headlamps has a failure in its LED block 2 or can turn on an alarm lamp.

As described above, storing the average voltage at every 10 minutes, which can become a decision reference of the LED failure, in the EEPROM 9 which is a nonvolatile memory element makes it possible to store the failure using a simple element. For example, even if an LED failure occurs during switch-off of the LED block 2 because the power is off, the EEPROM 9 stores the preceding average voltage, and this makes it possible to detect the difference of the output voltage, and to decide the failure continuously.

In addition, a configuration is also possible in which when the control circuit 8 detects a failure of an LED as described above, it stores the failure information indicating the failure in a prescribed storage area of the EEPROM 9, does not accept, when the LED block 2 including the failure LED is turned off because the power is off, the next and later lighting manipulations, reads out the failure information from the EEPROM 9, and supplies it to the failure state display unit 4. Thus, it can display the failure information on the failure state display unit 4 continuously when a part of the LEDs of the LED block 2 has a failure without carrying out the lighting operation of the LED block 2 anew even if a lighting manipulation is performed.

Incidentally, the failure information stored in the EEPROM 9 can be erased by supplying a particular signal to the control circuit 8. To be concrete, the control circuit 8 erases the failure information stored in the EEPROM 9 in response to an input signal corresponding to turning on or off of the failure information delete SW 5 or in response to a combination of input signals from an input device of the onboard equipment connected to the control circuit 8 via the communication I/F 13. As the erasing manipulation of the failure information, the following manipulations or the following combinations of manipulations can be used.

(1) Connecting a failure diagnostic apparatus other than the onboard equipment to the lighting apparatus 1, and carrying out the erasing manipulation from the failure diagnostic apparatus.

(2) Turning on or off the failure information delete SW 5.

(3) Setting wiring for communication at a prescribed voltage, and manipulating the power supply (lighting) to the lighting apparatus 1.

(4) Turning on or off the power supply (lighting) to the lighting apparatus 1 at prescribed timing.

(5) Turning on or off the power supply (lighting) to the lighting apparatus 1 by a prescribed number of times.

(6) Turning on or off an ignition (IG) power supply at prescribed timing.

(7) Turning on or off the IG power supply by a prescribed number of times.

(8) Turning on or off an accessory (ACC) power supply at prescribed timing.

(9) Turning on or off the ACC power supply by a prescribed number of times.

Providing the erasing manipulation of the failure information in this way makes it possible to use the LED block 2 again after repairing the failure occurring in the LED block 2.

In addition, when detecting a failure in the LED block 2 as described above, the control circuit 8 can control the DC/DC converter 7 in response to the detection so as to stop the lighting output to the LED block 2. Thus turning off the LED block 2 in which the failure occurs enables a driver to become clearly aware of a failure occurring in a part of the LEDs of the LED block 2.

Furthermore, a configuration is also possible in which even if the control circuit 8 detects a failure of an LED of the LED block 2, it continues the lighting operation until a switch-off manipulation of the LED block 2 is performed by an external manipulation such as turning off the power supply switch 3*a*, but does not carry out the lighting of the LED block 2 when the lighting operation of the LED block 2 is started again.

In this case, even if the LED failure is detected, the switching off is not made immediately so that the lighting operation of the LED block 2 including the failure LED is maintained. Thus, even if the LED failure is detected, switching off for informing of the failure is not performed during the lighting of the LED block 2.

By thus doing, even if a minor failure such as a short-circuit of one of the LEDs of the LED block 2 occurs, the headlamp is not turned off at an unexpected timing except for the manipulation of a driver's own will, thereby being able to continue safe driving.

Furthermore, a configuration is also possible in which the control circuit 8 continues the lighting operation until the vehicle stops even if a failure of an LED of the LED block 2 is detected.

In this case, if the failure of the LED has already been detected when the control circuit 8 decides that the vehicle stops from the vehicle-speed information acquired from the vehicle-speed sensor, it turns off the LED block 2 including the failure LED.

Since it is dangerous to turn off the headlamps during the traveling of the vehicle, the switch-off operation is not carried out during the traveling of the vehicle.

By thus doing, even if a minor failure occurs such as a short-circuit of one of the LEDs of the LED block 2, the vehicle can continue safe traveling without turning off the headlamps during the traveling of the vehicle.

In addition, a configuration is also possible in which the control circuit 8 supplies the failure state display unit 4 of the onboard equipment with information equivalent to the failure information, which causes the failure state display unit 4 to simulate a failure information display for a prescribed interval just after starting operation by turning the power on.

Unless a failure occurs actually, it is difficult to learn as to whether the failure state display unit 4 of the onboard equipment functions normally or not, or as to whether a signal line between the lighting apparatus 1 and the onboard equipment or the failure alarming operation of the lighting apparatus 1 itself functions normally or not.

Accordingly, the control unit 8 supplies the information simulating the failure information display to the onboard equipment for the prescribed interval immediately after turning the power on as described above. Thus, the failure state display unit 4 carries out the failure information display for only the prescribed interval so that this operation can enable a driver to confirm that no failure occurs in individual components.

For example, when the failure state display unit 4 is an alarm lamp, lighting the alarm lamp for a fixed time interval immediately after turning on the power supply, followed by switching it off, will enable a user to decide that no failure occurs in the alarm lamp, on the signal line between the lighting apparatus 1 and the onboard equipment, and in the lighting apparatus 1.

As described above, according to the present embodiment 1, it comprises the average processing unit 8*c* for sampling the output voltage for lighting the LED block 2 and for calculating the average voltage during every prescribed interval, and the storage unit such as the RAM 8*a* and EEPROM 9 for storing the average voltage during every prescribed interval calculated by the average processing unit 8*c*, and the control circuit 8 has a function of deciding the LED failure of the LED block 2 in accordance with a result of comparing the variation in the average voltage during every prescribed interval read out of the storage unit with the prescribed threshold.

By thus doing, it offers an advantage that a short-circuit failure occurring in an LED can be detected with a simple configuration.

Selecting a rather long period of time (such as 10 minutes) as the prescribed interval makes it possible to circumvent a failure detection error due to temperature variation in the LED chips including the temperature change in about one minute due to self-heating because the voltage, which is obtained by sampling and averaging the output voltage applied to the LED block 2 for a long time, is used for the failure detection.

In addition, in the foregoing embodiment 1, the control circuit 8 can be configured in such a manner as to correct the average of the output voltage in accordance with the temperature of the LED chips acquired from the temperature sensor 6 or the ambient temperature of the LED block 2 corresponding to it, and to decide the failure of an LED by comparing the corrected average voltage with the average voltage stored in the EEPROM 9 up to that time.

Since the forward voltage becomes rather high when the temperature of the LED chips is low, correcting the average of the output voltage to a lower value can give a close approximation to the actual value. For example, as for the LED block having 10 LEDs connected in series, the average voltage is corrected in the following conditions using the normal temperature (25° C.) as a reference, and the corrected value is compared with the preceding average voltage stored in the EEPROM 9.

(1a) If the detection temperature is beyond 115° C., it is corrected to "average voltage −0 V".

(2a) If the detection temperature is 85° C., it is corrected to "average voltage −1 V".

(3a) If the detection temperature is 55° C., it is corrected to "average voltage −2 V".

(4a) If the detection temperature is 25° C., it is corrected to "average voltage −3V".

Thus adding the temperature information about the LEDs to the decision reference of the LED failure makes is possible to detect a short-circuit failure occurring in an LED positively. In addition, it can reduce the time taken for averaging the output voltage.

Incidentally, the foregoing embodiment 1 shows a case of detecting a short-circuit failure of an LED from the voltage drop of the LED. In contrast with this, as for the configuration in which a Zener diode or the like is connected in parallel with each of the LEDs for protecting them, if an LED has an open failure, the characteristics of the Zener diode are actualized and the output voltage increases sharply. Accordingly, a configuration is also possible which detects a decrease and an increase as the changes of the output voltage, sets a threshold of the average voltage difference in the case where the voltage reduces and a threshold of the average voltage difference in the case where the voltage increases, and makes a failure decision of the two cases by comparing the average voltages.

Embodiment 2

Although the headlamp LED lighting apparatus of the present embodiment 2 has basically the same configuration with the foregoing embodiment 1 explained with reference to FIG. 1, it differs in the processing of detecting a failure of an LED. Accordingly, as for the configuration of the headlamp LED lighting apparatus of the embodiment 2, let us refer to FIG. 1.

Next, the operation will be described.

Figure 4:
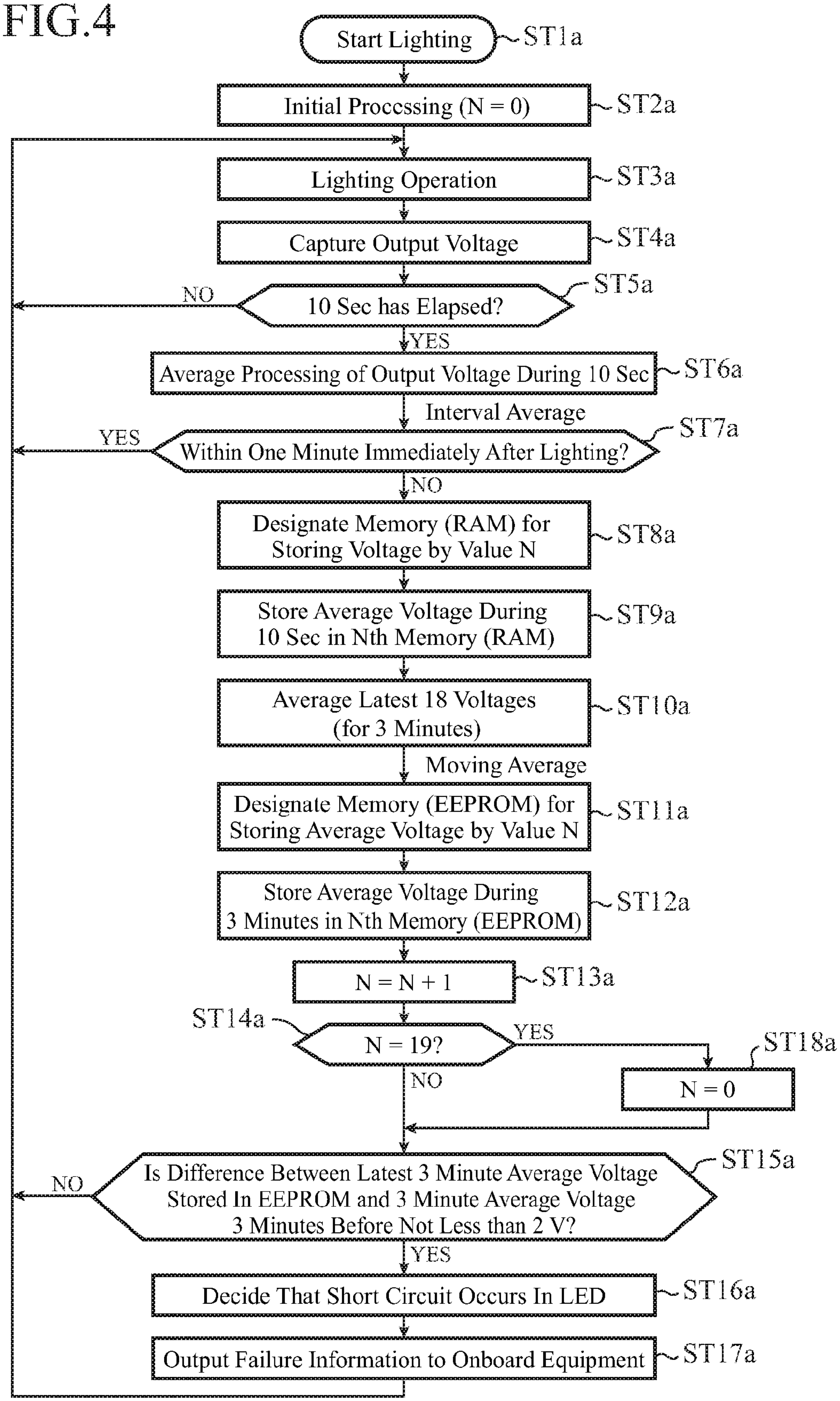
FIG. 4 is a flowchart showing a flow of LED failure detection of a headlamp LED lighting apparatus of an embodiment 2 in accordance with the present invention.

FIG. 4 is a flowchart showing a flow of the LED failure detection in the headlamp LED lighting apparatus of the embodiment 2.

First, when a manipulation for starting to light the LED block 2 is performed (step ST1*a*), the control circuit 8 initializes a timing parameter N to zero (step ST2*a*). Subsequently, in accordance with the control of the control circuit 8, the DC/DC converter 7 converts the DC voltage of the power supply 3 to the output voltage and supplies it to the LED block 2 via the output voltage I/F 10 (step ST3*a*).

Subsequently, the control circuit 8 captures the output voltage at every prescribed sampling timing (ST) via the output voltage I/F 10 (step ST4*a*). In this case, the control circuit 8 stores values of the output voltage captured in a prescribed work area of the RAM 8*a*. Next, the control circuit 8 makes a decision as to whether 10 seconds has elapsed or not by using the timer 8*b* (step ST5*a*). If 10 seconds has not yet elapsed (NO at step ST5*a*), it returns to the processing at step ST3*a* to carry out the lighting operation and sampling of the output voltage.

If 10 seconds has elapsed (YES at step ST5*a*), the average processing unit 8*c* of the control circuit 8 adds output voltage values for 10 seconds from the start of lighting, which are read out of the work area of the RAM 8*a*, and calculates the average voltage (interval average voltage) by dividing the addition value by the number of samplings during the 10 seconds (step ST6*a*). After that, the control circuit 8 makes a decision as to whether the present point in time is within one minute immediately after lighting by using the timer 8*b* (step ST7*a*). If the present point in time is within one minute immediately after lighting (YES at step ST7*a*), the control circuit 8 annuls the average voltage calculated, and returns to step ST3*a* to repeat the foregoing processing until one minute immediately after lighting has elapsed.

If the present point has elapsed one minute immediately after lighting (NO at step ST7*a*), the control circuit 8 designates a storage area corresponding to the timing parameter N (step ST8*a*), and stores the average voltage during 10 seconds in the foregoing designated area of the memory (RAM) corresponding to the timing parameter N (step ST9*a*).

The average processing unit 8*c* of the control circuit 8 reads the average voltages of individual 10 seconds for the latest three minutes from a storage area of N=0-18 in the RAM 8*b*, adds the 18 average voltages, and calculates the average voltage (moving average voltage) by dividing the addition value by "18" (step ST10*a*).

The average processing unit 8*c* stores the average voltage during the 3 minutes in the memory (EEPROM) corresponding to the timing parameter N (step ST11*a* and step ST12*a*).

Next, the control circuit 8 adds one to the timing parameter N (step ST13*a*), and makes a decision as to whether the parameter N is 19 or not (step ST14*a*). If the timing parameter N is 19 (YES at step ST14*a*), it resets the timing parameter N (step ST18*a*).

The control circuit 8 reads from the EEPROM 9 the average voltage during the latest 3 minute interval and the average voltage during the 3 minute interval 3 minutes before, compares them and makes a decision as to whether the difference between the average voltages is not less than a prescribed threshold or not (step ST15*a*). In the example of FIG. 4, the prescribed threshold is made 2 V. In addition, the difference between the average voltages is a value obtained by subtracting the average voltage during the latest 3 minute interval from the average voltage during the 3 minute interval 3 minutes before.

Incidentally, the average voltage during the latest 3 minute interval is the average of the output voltage sampled from 3 minutes before to the present time. In addition, the average voltage during the 3 minute interval 3 minutes before is the average of the output voltage sampled from 6 minutes before the present time to the 3 minutes before.

If the difference between the average voltages is less than 2 V (NO at step ST15*a*), the control circuit 8 returns to the processing at step ST3*a* to repeat the processing from step ST3*a* to step ST15*a*. If the difference between the average voltages is not less than 2 V (YES at step ST15*a*), the control circuit 8 makes a decision that a short-circuit occurs in an LED of the LED block 2 (step ST16*a*).

Incidentally, even if a switch-off operation of the LED block 2 occurs during lighting because the power supply is turned off, since the average voltage during the 3 minute interval before the switch-off remains in the EEPROM 9, the LED failure occurring during the switch-off as shown in FIG. 2(*c*) can be detected.

Detecting the short circuit of an LED of the LED block 2, the control circuit 8 supplies the onboard equipment with the failure information indicating the occurrence of the short circuit of the LED via the output I/F 14 (step ST17*a*). Thus, the failure state display unit 4 of the onboard equipment displays the failure information.

As described above, according to the present embodiment 2, considering that the variation in the output voltage (forward voltage) immediately after the start of lighting is large because of the heating of the LED chips owing to the current supply, it sets a sufficient period of time for convergence of the change in the output voltage from the start of lighting, and does not use for calculating the average voltage the output voltages sampled within the foregoing prescribed time period among the output voltages sampled for calculating the average voltage to be used as the failure decision reference.

By thus doing, it can detect the short-circuit failure of the LED positively without using for the failure decision of the LED the voltage drop which is due to the self-heating of the LED immediately after lighting and can cause a decision error. In addition, since it is unnecessary to reduce the change in the average voltage by increasing the number of samplings of the output voltage, it can save the time taken for the short-circuit decision of the LED. For example, although the foregoing embodiment 1 carries out the average processing of 10 minutes, the embodiment 2 can reduce it to the average processing of 3 minutes.

Embodiment 3

Although the headlamp LED lighting apparatus of the present embodiment 3 has basically the same configuration with the foregoing embodiment 1 explained with reference to FIG. 1, it differs in the processing of detecting a failure of an LED. Accordingly, as for the configuration of the headlamp LED lighting apparatus of the embodiment 3, let us refer to FIG. 1.

Next, the operation will be described.

Figure 5:
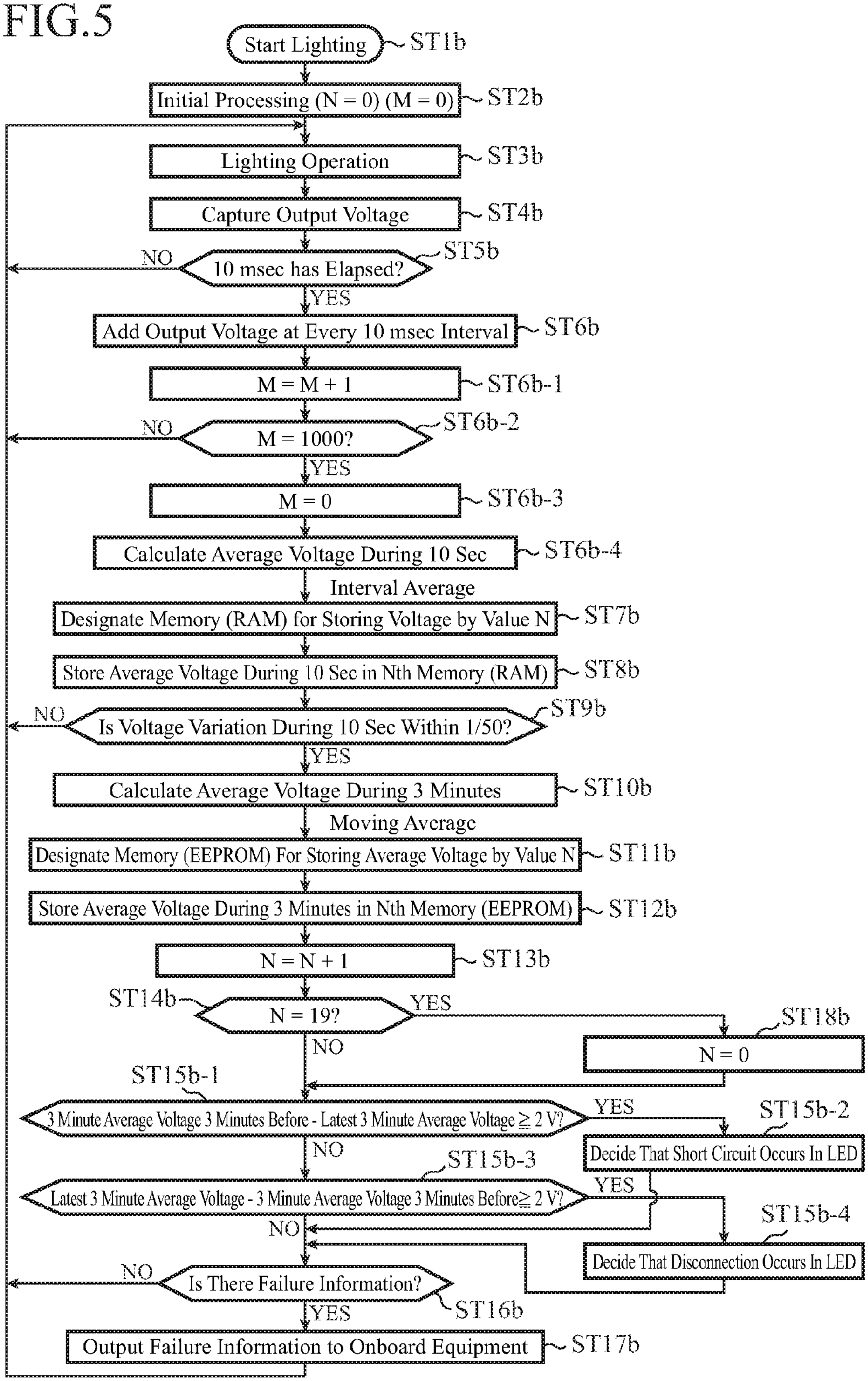
FIG. 5 is a flowchart showing a flow of LED failure detection of a headlamp LED lighting apparatus of an embodiment 3 in accordance with the present invention.

FIG. 5 is a flowchart showing a flow of the LED failure detection in the headlamp LED lighting apparatus of the embodiment 3.

First, when a manipulation for starting to light the LED block 2 is performed (step ST1*b*), the control circuit 8 initializes timing parameters N and M to zero (step ST2*b*). Subsequently, in accordance with the control of the control circuit 8, the DC/DC converter 7 converts the DC voltage of the power supply 3 to the output voltage and supplies it to the LED block 2 via the output voltage I/F 10 (step ST3*b*).

Subsequently, the control circuit 8 captures the output voltage at every prescribed sampling timing (ST) via the output voltage I/F 10 (step ST4*b*). In this case, the control circuit 8 stores values of the output voltage captured in a prescribed work area of the RAM 8*a*.

Next, the control circuit 8 makes a decision as to whether 10 msec has elapsed or not by using the timer 8*b* (step ST5*b*). If 10 msec has not yet elapsed (NO at step ST5*b*), it returns to the processing at step ST3*b* to carry out the lighting operation and sampling of the output voltage.

If 10 msec has elapsed (YES at step ST5*b*), the control circuit 8 adds the output voltage at the point of 10 msec (step ST6*b*). In this case, the control circuit 8 successively adds the output voltage at every 10 msec interval and stores the addition values in a prescribed work area of the RAM 8*a*.

Next, the control circuit 8 adds one to the parameter M (step ST6*b*-1), and makes a decision as to whether the parameter M becomes 1000 or not (step ST6*b*-2). If the parameter M is less than 1000 (NO at step ST6*b*-2), the control circuit 8 returns to the processing at step ST3*b* to repeat the processing from step ST3*b*.

When the parameter M becomes 1000 (YES at step ST6*b*-2), the control circuit 8 resets the parameter M (step ST6*b*-3), and the average processing unit 8*c* of the control circuit 8 divides the output voltage in the 10 second interval (value corresponding to 1000 additions at every 10 msec interval) read out of the RAM 8*a* by 1000, thereby calculating the interval average voltage during the 10 second interval (step ST6*b*-4).

After that, the control circuit 8 designates a storage area corresponding to the timing parameter N among the average voltage storage areas for N=0-18 in the RAM 8*a* (step ST7*b*), and stores the interval average voltage during the 10 second interval in the designated area in the memory (RAM) corresponding to the timing parameter N (step ST8*b*).

The control circuit 8 reads from the storage area of the RAM 8*b* the interval average voltage immediately preceding 10 second interval, calculates the voltage variation during the 10 second interval by dividing the immediately preceding 10 second interval average voltage by the latest 10 second interval average voltage, and makes a decision as to whether the voltage variation is within 1/50 or not (step ST9*b*).

When the voltage variation is not less than 1/50 (NO at step ST9*b*), the control circuit 8 returns to the processing at step ST3*b* to repeat the processing from step ST3*b* to step ST9*b*.

On the other hand, if the voltage variation is less than 1/50 (YES at step ST9*b*), the average processing unit 8*c* of the control circuit 8 reads from the storage area of the RAM 8*b* the interval average voltages in 10 second intervals during the latest 3 minute interval, and calculates the moving average voltage during the 3 minute interval by adding the 18 interval average voltages and by dividing by "18" (step ST10*b*).

It stores the moving average voltage during the 3 minute interval in the memory (EEPROM) corresponding to the timing parameter N (step ST11*b* and step ST12*b*).

Next, the control circuit 8 adds one to the timing parameter N (step ST13*b*), and makes a decision as to whether the parameter N is 19 or not (step ST14*b*). If the timing parameter N is 19 (YES at step ST14*b*), the control circuit 8 resets the timing parameter N (step ST18*b*).

The control circuit 8 reads from the EEPROM 9 the moving average voltage during the latest 3 minute interval and the moving average voltage during the 3 minute interval 3 minutes before, and makes a decision as to whether the difference between the average voltages, which is obtained by subtracting the moving average voltage during the latest 3 minute interval from the moving average voltage during the 3 minute interval 3 minutes before, is not less than a prescribed threshold or not (step ST15*b*-1). In the example of FIG. 5, the prescribed threshold is made 2 V. If the difference between the average voltages is not less than 2 V (YES at step ST15*b*-1), the control circuit 8 decides that a short circuit occurs in an LED of the LED block 2 (step ST15*b*-2). When detecting the LED short circuit, the control circuit 8 retains the failure information indicating the occurrence of the LED short circuit in the EEPROM 9.

When the difference between the average voltages is less than 2 V (NO at step ST15*b*-1), the control circuit 8 makes a decision as to whether the difference between the average voltages, which is obtained by subtracting the moving average voltage during the 3 minute interval 3 minutes before from the moving average voltage during the latest 3 minute interval, is not less than 2 V or not (step ST15*b*-3). If the difference between the average voltages is not less than 2 V (YES at step ST15*b*-3), the control circuit 8 decides that an LED in the LED block 2 has disconnection (step ST15*b*-4). When detecting the LED disconnection, the control circuit 8 stores the failure information indicating the LED disconnection in the EEPROM 9.

Incidentally, even if a switch-off operation of the LED block 2 occurs during lighting because the power supply is turned off, since the average voltage during the 3 minute interval before the switch-off remains in the EEPROM 9, the failure can be detected.

Next, the control circuit 8 checks whether the EEPROM 9 has the failure information or not (step ST16*b*). In this case, unless the EEPROM 9 has the failure information (NO at step ST16*b*), the control circuit 8 returns to the processing at step ST3*b*. If the EEPROM 9 has the failure information, the control circuit 8 reads the failure information from it, and supplies to the onboard equipment via the output I/F 14 (step ST17*b*). Thus, the failure state display unit 4 of the onboard equipment displays the failure information.

As described above, according to the present embodiment 3, considering that as compared with the change in the forward voltage when an LED has a short circuit, the voltage change due to self-heating of the LED chips immediately after lighting (immediately after a start of light emission or immediately after a start of current supply) or the voltage change resulting from the change in the ambient temperature of the LED chips is slow, it does not use for the calculation of the average voltage the output voltage sampled during the slow voltage change.

For example, when a voltage change not less than 1/50 occurs during a 10 second interval, it does not use the output voltage sampled during this interval, in which the voltage change occurs, for calculating the average voltage, but uses after the voltage change not less than 1/50 is stabilized to less than 1/50 during a 10 second interval.

As a result, since the output voltage changes sharply at the instant an LED has a short circuit, the output voltage at that time is not used for the averaging processing. However, since the output voltage is stabilized after the short circuit of the LED, the output voltage sampled after that can be used for the averaging processing, and the voltages before and after the short circuit of the LED can be clearly distinguished.

By thus doing, the present embodiment 3 can detect a failure such as a short circuit or disconnection of an LED positively without using unstable voltage that can cause a decision error for deciding a failure of an LED. In addition, since it does not need to reduce the change of the average voltage by increasing the number of samplings of the output voltage, it can reduce the time taken for making a failure decision of an LED. For example, although the foregoing embodiment 1 carries out the average processing in a 10 minute interval, the embodiment 3 can reduce to the average processing in a 3 minute interval.

Incidentally, in the foregoing embodiment 1 to the foregoing embodiment 3, a configuration is also possible which has a communication unit for exchanging output voltage information about first and second lighting apparatuses of headlamps mounted on right and left portions of a vehicle, wherein according to the information the communication unit transmits and receives, the control circuit stops making a decision of an LED failure based on the change in the average voltage when the change in the average voltage of the first lighting apparatus is nearly equal to the change in the average voltage of the second lighting apparatus at the same time.

Although the environments of the right and left headlamps of the vehicle are about the same and the states of the LEDs for the headlamps are about the same, a possibility is low that the LEDs for the right and left headlamps of the vehicle have a failure at the same time.

Accordingly, it is usually due to the changes in the environments of the LEDs but not to an LED failure that the output voltages of the LEDs for the right and left headlamps of the vehicle change in the same manner.

Accordingly, when the variation in the average voltage of the output voltage obtained from the second lighting apparatus by communication is about the same as the variation in the average voltage of the output voltage of the first lighting apparatus, even if the voltage change with respect to the preceding voltage is large, it does not make a failure decision of an LED. In other words, when it is assumed that the environment of the current lighting has changed from the environment of the preceding lighting, it stops making a decision from the change in the average voltage that a failure occurs in an LED.

On the other hand, when the variation in the average voltage of the output voltage obtained from the second lighting apparatus by communication differs from the variation of the average voltage of the output voltage of the first lighting apparatus, since it is considered that a failure occurs in an LED of the first or second lighting apparatus, it makes a failure decision of an LED. By thus doing, it can improve the reliability of the LED failure decision.

As an example where the output voltage of the LEDs changes depending on an environment, there is a case of traveling with the headlamp LEDs being lit in the daytime, followed by traveling with the headlamp LEDs being lit in the nighttime. In this case, the EEPROM 9 stores the average voltage of the output voltage applied in a high temperature in the daytime. Then, at the start of traveling in the nighttime with the LEDs being lit, the average voltage at the high temperature in the daytime and the average voltage of the LEDs at a low temperature in the nighttime, which are stored in the EEPROM 9, are used to be compared to make a failure decision.

Likewise, a case is conceivable of traveling with the headlamp LEDs being lit in summer, followed by not using the vehicle thereafter, and by using the vehicle again in winter. In this case, the EEPROM 9 stores the average voltage of the output voltage applied in a high temperature in summer. Then, at the start of traveling in winter with the headlamp LEDs being lit, the average voltage in summer and the average voltage of the output voltages applied in a low temperature in winter, which are stored in the EEPROM 9, are used to be compared to make a failure decision.

Furthermore, in the foregoing embodiment 1 to the foregoing embodiment 3, a configuration is also possible which has a communication unit for exchanging the output voltage information and failure information between first and second lighting apparatuses for headlamps mounted on right and left portions of a vehicle, wherein according to the output voltage information about the second lighting apparatus received via the communication unit, the control circuit of the first lighting apparatus makes a failure decision of the second lighting apparatus in accordance with the change in the average voltage of the output voltage, and transmits, when making a decision that the second lighting apparatus has a failure, the failure information to the second lighting apparatus.

Alternatively, a configuration is also possible in which when the control circuit of the first lighting apparatus makes a failure decision from a change in the average voltage of the output voltage applied to its LEDs and when it receives the failure information about itself, which is decided by the second lighting apparatus, via the communication unit, it compares the failure information it decides with the failure information decided by the second lighting apparatus, and makes a decision that a failure occurs in its LED if they agree with each other. By thus doing, it can further improve the reliability of the LED failure decision because its failure is decided in both the right and left lighting apparatuses.

Industrial Applicability

A headlamp LED lighting apparatus in accordance with the present invention can detect the occurrence of an LED failure positively even if an environment changes. Accordingly, it is suitable for headlamp LED lighting apparatuses of a car.

What is claimed is:

1. A headlamp LED lighting apparatus for lighting a headlamp which employs as its light source an LED block having a plurality of LEDs connected in series, the headlamp LED lighting apparatus including a control unit for supplying lighting power to the LED block, the control unit comprising:

an average processing unit for calculating an average voltage during every prescribed interval by sampling an output voltage for lighting the LED block; and a storage unit for storing the average voltage during every prescribed interval calculated by the average processing unit, wherein the control unit has a function of making a decision of an LED failure of the LED block in accordance with a result of comparing a prescribed threshold with a voltage variation in the average voltage during every prescribed interval read out of the storage unit.

2. The headlamp LED lighting apparatus according to claim 1, wherein the average processing unit does not use for calculating the average voltage the output voltage sampled in a prescribed interval immediately after turning on the LED block.

3. The headlamp LED lighting apparatus according to claim 1, wherein the control unit does not use, when the voltage variation between an immediately preceding average voltage and an immediately following average voltage among the average voltages during the prescribed intervals is greater than a prescribed threshold, these two average voltages for the decision.

4. The headlamp LED lighting apparatus according to claim 1, wherein the control unit captures a measured value of an ambient temperature of the LEDs, corrects the average voltage to a value corresponding to the ambient temperature at the present point in time in accordance with relations between the lighting voltage of the LEDs and the ambient temperature, and decides an LED failure of the LED block in accordance with a result of comparing a voltage variation between the corrected average voltage and a previous average voltage read out of the storage unit with the prescribed threshold.

5. The headlamp LED lighting apparatus according to claim 1, wherein the control unit:

comprises a nonvolatile storage unit for storing failure information indicating an occurrence of an LED failure; and decides whether to light the LED block or not in accordance with the failure information readout of the nonvolatile storage unit, when the LED block is switched off because a power supply is turned off and when a lighting manipulation is carried out after the switch-off.

6. The headlamp LED lighting apparatus according to claim 5, wherein the control unit erases the failure information stored in the nonvolatile storage unit in response to an input signal of a prescribed signal.

7. The headlamp LED lighting apparatus according to claim 1, wherein the control unit supplies onboard equipment with a signal equivalent to failure information during a prescribed interval immediately after turning on a power supply.

8. The headlamp LED lighting apparatus according to claim 1, wherein a storage element the storage unit comprises for storing the average voltage and failure information indicating an occurrence of the LED failure is nonvolatile.

9. A headlamp LED lighting apparatus to be mounted on a first side of right and left of a vehicle for lighting a headlamp that employs as its light source an LED block having a plurality of LEDs connected in series, a control unit the headlamp LED lighting apparatus includes comprising:

a communication unit for exchanging information about an LED failure defined in at least claim 1 with a second headlamp LED lighting apparatus mounted on a second side of the vehicle.

10. The headlamp LED lighting apparatus according to claim 9, wherein the control unit exchanges information about an occurrence of the LED failure with the second headlamp LED lighting apparatus mounted on the vehicle via the communication unit, does not stop, even if an LED failure occurs in both LED blocks of the first and second headlamp LED lighting apparatuses, supplying lighting power to at least one of the LED blocks capable of being lit, and continues lighting the LED block capable of being lit.

11. The headlamp LED lighting apparatus according to claim 9, wherein when a voltage variation in an average voltage of output voltage of the second headlamp LED lighting apparatus, the voltage variation being received by the first headlamp LED lighting apparatus by exchanging information indicating the output voltage with the second headlamp LED lighting apparatus mounted on the vehicle via the communication unit, is approximately equal to a voltage variation in an average voltage of output voltage to be supplied to the LED block of the first headlamp LED lighting apparatus, the control unit does not use for other control, information that the LED failure occurs in the LED block, even if the control unit decides its LED failure.

12. The headlamp LED lighting apparatus according to claim 9, wherein the control unit exchanges via the communication unit, information indicating output voltage with the second headlamp LED lighting apparatus mounted on the vehicle, calculates an average voltage during every prescribed interval of the second headlamp LED lighting apparatus, decides an LED failure of the second in accordance with a voltage variation in the average voltage during every prescribed interval calculated, and supplies a result of the decision to the second headlamp LED lighting apparatus by communication; and wherein the control unit receives its own LED failure information from the second headlamp LED lighting apparatus, the LED failure information being decided by the second headlamp LED lighting apparatus from a voltage variation in an average voltage of the output voltage of the first headlamp LED lighting apparatus, compares the LED failure information with LED failure information about its own LED block as to which the control unit makes a decision by itself, and makes a final decision that an LED failure occurs in its LED block if the two items of the LED failure information have the same content.

13. A vehicle headlamp lighting system comprising:

the headlamp LED lighting apparatus as defined in claim 9; and a failure information presentation unit mounted on onboard equipment for showing an occurrence of a failure by receiving failure information from the headlamp LED lighting apparatus.

14. A headlamp LED lighting apparatus including a control unit for lighting a headlamp which employs as its light source an LED block having a plurality of LEDs connected in series, wherein the control unit:

comprises a function of deciding an LED failure of the LED block; and stops supplying lighting power to the LED block when deciding that the LED failure occurs in the LED block.

15. The headlamp LED lighting apparatus according to claim 14, wherein the control unit, even if it decides that the LED failure occurs in the LED block, maintains lighting until a switch-off operation of the LED block is carried out owing to turning off of a power supply, and does not supply the lighting power to the LED block even if a lighting manipulation is performed after the switch-off following the switch-off operation.

16. The headlamp LED lighting apparatus according to claim 14, wherein the control unit captures vehicle-speed information about a vehicle thereof, and does not stop supplying the lighting power to the LED block until the vehicle stops even if it decides that the LED failure occurs in the LED block.

* * * * *